Nov. 11, 1924.　　　　　　　　　　　　　　　　1,514,728
C. E. REDDIG
REVERSING MECHANISM
Filed June 23, 1922
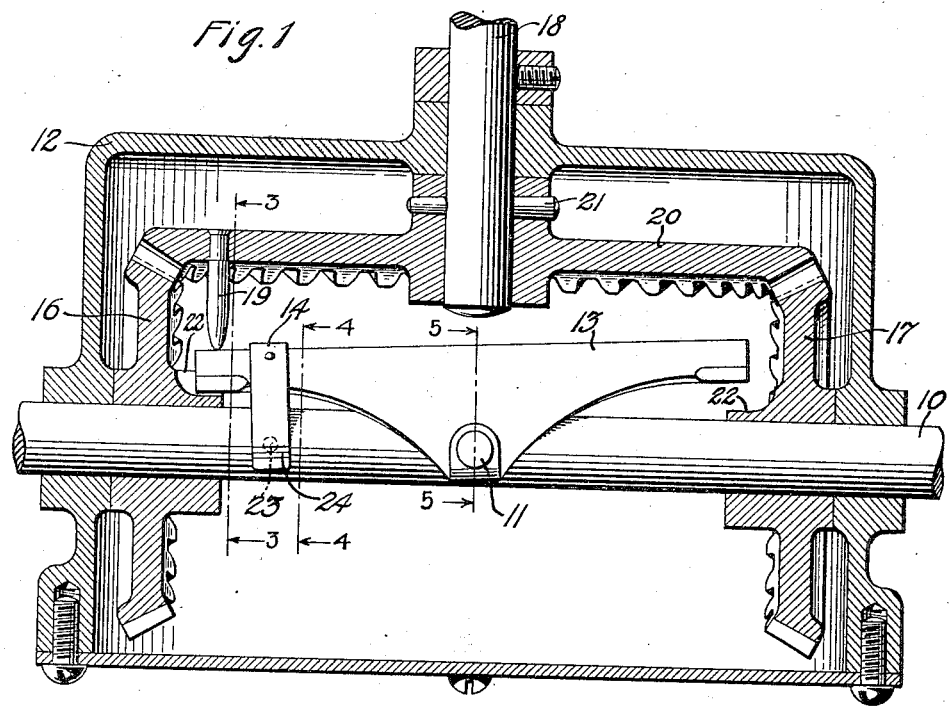
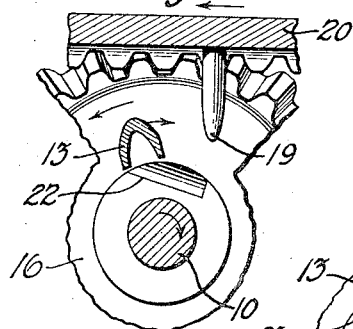
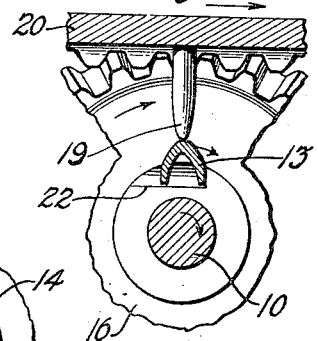
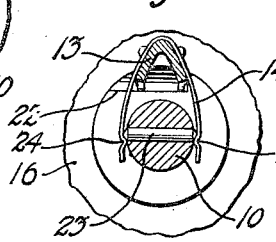
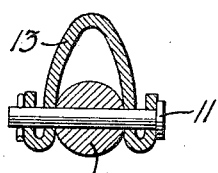
Inventor:
Charles E. Reddig
by Joel Ch. Palmer
Att'y.

Patented Nov. 11, 1924.

1,514,728

UNITED STATES PATENT OFFICE.

CHARLES E. REDDIG, OF RICHMOND HILL, NEW YORK, ASSIGNOR TO WESTERN ELECTRIC COMPANY, INCORPORATED, OF NEW YORK, N. Y., A CORPORATION OF NEW YORK.

REVERSING MECHANISM.

Application filed June 23, 1922. Serial No. 570,438.

*To all whom it may concern:*

Be it known that I, CHARLES E. REDDIG, a citizen of the United States, residing at Kew Gardens, Richmond Hill, in the county of Queens, State of New York, have invented certain new and useful Improvements in Reversing Mechanisms, of which the following is a full, clear, concise, and exact description.

This invention relates to reversing mechanisms and particularly to a gear reversing mechanism.

An object of the invention is to provide a simple, inexpensive, efficient and reliable reversing mechanism for bringing about the immediate and positive reversal of a driven element.

In accordance with the general features of this invention the driven shaft is provided with a bevel gear in mesh with two oppositely facing bevel pinions on the driven shaft to drive them in opposite directions. Carried by the driven shaft is a clutch member adapted to be operated intermittently in the rotation of the beveled gear to be alternately engaged with the beveled pinions, the engagement of the clutch member with one pinion occurring practically simultaneously with the disengagement from the other to produce an almost instantaneous reversal of the driven shaft. In the preferred form of the invention the pinions are provided on their hubs with oppositely disposed cam faced depressions terminating in shoulders and the pinions are so mounted that these portions are in the same position relative to the driven shaft, that is, in a line parallel to the shaft.

In the drawing, Fig. 1 is a longitudinal sectional view of the main structure of the reversing mechanism.

Fig. 2 is a fragmentary view at right angles to the driving shaft, showing the rocker bar in a position before making contact with the cam.

Fig. 3 is a fragmentary view on the line 3—3 of Fig. 1.

Fig. 4 is a fragmentary view on the line 4—4 of Fig. 1.

Fig. 5 is a fragmentary view on the line 5—5 of Fig. 1.

Referring to the drawings in detail, a driving shaft 10 (Fig. 1) journalled into the casing 12 has loosely mounted thereon two driving pinions 16 and 17. Each of these pinions 16 and 17 is provided on its hub with a cam faced notch 22 terminating in a shoulder. The pinions 16 and 17 are mounted on the shaft 10 so that the notches 22, 22 will occupy the same position relative to the shaft, that is a straight line drawn through one notch and running parallel with the shaft 10 will pass through the other notch. A rocker bar 13 which is pivotally mounted on the shaft 10 by means of a pin 11, (Figs. 1 and 5) is adapted to be moved intermittently and alternately into engagement with the notches 22, 22 on the hubs of the pinions 16 and 17 by means of a pin 19 carried by a facing gear 20 firmly secured to the driven shaft 18 by a key 21. The rocker bar 13 is provided with a spring detent 14, which straddles the driving shaft 10 and engages a pin 23 (Fig. 4).

The operation of the reversing gear is as follows: Assuming the parts to be in the position shown in Fig. 1 with the lever 13 in driving engagement with the pinion 16. The engagement of the rocker bar 13 with the driving pinion 16 causes the driven shaft 18 to rotate in a clockwise direction. After a predetermined number of revolutions the shifting pin 19 comes into contact with the rocker bar 13, this time at the opposite end, and knocks it out of engagement with the pinion 16 and into engagement with the pinion 17. Due to the fact that the notches 22, 22 in the hubs of the pinions 16 and 17 are in the same relative position with respect to the shaft 10 and the rocker bar 13 the disengagement of the rocker bar 13 from the notch 22 of one pinion will be practically simultaneous with its engagement with the other.

The shifting pin 19 on the facing gear 20 (Fig. 2) is shown rotating in a counter clockwise direction just prior to coming in contact with the rocker bar 13, which is rotating in a clockwise direction with the shaft 10. The notched hub 22 is shown approaching the rocker bar 13. Fig. 3 shows the shifting pin 19 in a position just after forcing the rocker bar 13 into engagement with the notched hub 22 of the pinion 17 on the opposite end of the driving shaft 10, thereby causing a reversal of the direction of rotation of the driven mechanism.

The shaft 10 is provided with a pin 23 (Fig. 4) which passes through and projects beyond its surface in the form of shoulders. The spring detent 14 is provided with inwardly projecting beads 24, 24 adapted to grip below these shoulders when the rocker bar 13 is in the position shown in Fig. 1. When the rocker bar 13 is moved out of position by the shifting pin 19 and engages the opposite pinion the beads 24, 24 of the spring detent 14 slip over the shoulders to securely hold the rocker bar 13 in this alternate position until the next action of the shifting pin 19 takes place.

Ample surfaces are provided on both the rocker bar 13 and the sides of the notched hubs 22 to permit positive engagement of these members thereby eliminating faulty operation due to slight shifts in the position of the rocker bar 13.

What is claimed is:

1. In a reversing gear mechanism, a driving shaft, a driven shaft, a gear carried by one of said shafts, a pair of pinions loosely mounted on the other shaft and meshing with said gear, a hub integrally formed with each of said pinions, a notch in each of said hubs, said notches being correspondingly positioned with respect to the shaft upon which said pinions are mounted, a rocker bar pivotally mounted on said driving shaft and adapted to be tilted into engagement with said notches to rotate said pinions with the driving shaft, and a shifting pin mounted on said gear and adapted for engagement with said rocker bar to force said bar into locking engagement with the notch in one of said hubs when disengaged from the notch in the other hub.

2. In a reversing gear mechanism, a driving shaft, a driven shaft, a gear carried by said driven shaft, a pair of pinions loosely mounted on said driving shaft and meshing with said gear, a hub integrally formed with each of said pinions, a notch in each of said hubs, said notches being correspondingly positioned with respect to said driving shaft, a rocker bar pivotally mounted on said driving shaft and adapted for locking said pinions to operate said driven shaft, a shifting pin on said gear adapted for alternately and intermittently forcing said rocker bar into engagement with the notches in said hubs and a pair of cooperating springs for holding said rocker bar in its operated position in the notch of one of said hubs.

3. In a reversing gear mechanism, a driving shaft, a driven shaft, a gear carried by one of said shafts, a pair of pinions loosely mounted on the other shaft and meshing with said gear, a notch in each of said pinions, said notches being correspondingly positioned with respect to the shaft on which said pinions are mounted, a rocker bar pivotally mounted on said driving shaft and adapted to be tilted alternately into engagement with said notches for locking said pinions to rotate with the driving shaft, means for causing said rocker bar to engage the notch in one of said pinions simultaneously with its disengagement from the notch in the other pinion, and a spring detent straddling said rocker bar and cooperating with means on said driving shaft to lock said rocker bar in its operated position and to prevent the vibration thereof.

4. In a reversing gear mechanism, the combination of a driving shaft, a driven shaft, a gear carried by said driven shaft, a pair of pinions loosely mounted on said driving shaft and meshing with said gear, a notched hub carried by each of said pinions, means for alternately and intermittently engaging said hubs for causing said pinions to rotate with the shaft for transmitting movement to said driven shaft, and a pair of springs carried by said means for holding said means in its operated position and for preventing the vibration thereof.

5. In a reversing gear mechanism, the combination of a driving shaft, a driven shaft, a gear carried by said driven shaft, a pair of pinions loosely mounted on said driving shaft and meshing with said gear, an abutment carried by each of said pinions, a channel-shaped rocker bar pivoted on said driving shaft, bearing portions integrally formed at the ends of said rocker bar for engaging said abutments respectively, and means for rocking said bar into operable relation with said abutments for changing the direction of movement of said driven shaft.

In witness whereof, I hereunto subscribe my name this 21st day of June, A. D., 1922.

CHARLES E. REDDIG.